United States Patent
Saeedmanesh et al.

(10) Patent No.: US 12,291,793 B2
(45) Date of Patent: May 6, 2025

(54) STEAM RECYCLE CONTROL

(71) Applicant: Bloom Energy Corporation, San Jose, CA (US)

(72) Inventors: Alireza Saeedmanesh, San Jose, CA (US); Ehsan Raoufat, San Jose, CA (US); Ali Zargari, San Jose, CA (US); Julio Luna, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/155,143

(22) Filed: Jan. 17, 2023

(65) Prior Publication Data

US 2023/0227991 A1    Jul. 20, 2023

Related U.S. Application Data (60) Provisional application No. 63/299,891, filed on Jan. 14, 2022, provisional application No. 63/299,895, filed on Jan. 14, 2022, provisional application No. 63/299,887, filed on Jan. 14, 2022.

(51) Int. Cl.
| | |
|---|---|
| *C25B 9/00* | (2021.01) |
| *C25B 1/042* | (2021.01) |
| *C25B 9/19* | (2021.01) |
| *C25B 9/70* | (2021.01) |
| *C25B 15/025* | (2021.01) |
| *C25B 15/027* | (2021.01) |
| *C25B 15/08* | (2006.01) |

(52) U.S. Cl.
CPC ............ *C25B 15/087* (2021.01); *C25B 1/042* (2021.01); *C25B 9/19* (2021.01); *C25B 9/70* (2021.01); *C25B 15/025* (2021.01); *C25B 15/027* (2021.01)

(58) Field of Classification Search
CPC ............ H01M 16/003; H01M 8/1246; H01M 2008/1293; H01M 2300/0071; C25B 1/042

See application file for complete search history.

(56) References Cited

U.S. PATENT DOCUMENTS

| | | | |
|---|---|---|---|
| 2017/0175277 A1* | 6/2017 | von Olshausen | C25B 9/05 |
| 2018/0131018 A1* | 5/2018 | Perry | H01M 8/04201 |
| 2019/0245224 A1* | 8/2019 | Lacroix | H01M 8/04014 |
| 2020/0328445 A1* | 10/2020 | Weingaertner | H01M 8/1231 |

(Continued)

FOREIGN PATENT DOCUMENTS

| | | |
|---|---|---|
| CA | 3165456 A1 | 8/2021 |
| CN | 113278992 B | 9/2021 |
| EP | 4186996 A1 | 5/2023 |

(Continued)

OTHER PUBLICATIONS

Search Report issued Jun. 14, 2023 in corresponding European Patent Application No. 23151726.9.

(Continued)

*Primary Examiner* — Zulmariam Mendez
(74) *Attorney, Agent, or Firm* — THE MARBURY LAW GROUP PLLC (57) ABSTRACT

A solid oxide electrolyzer cell (SOEC) system including a stack of electrolyzer cells configured to receive water or steam in combination with hydrogen, and a steam recycle outlet configured to recycle a portion of the water or steam.

13 Claims, 6 Drawing Sheets

(56) References Cited

U.S. PATENT DOCUMENTS

2023/0046387 A1    2/2023  Peschel et al.

FOREIGN PATENT DOCUMENTS

| JP | 11-214021 | | 8/1998 | |
|---|---|---|---|---|
| JP | 2020128576 | * | 8/2020 | ............... C25B 1/04 |
| WO | WO2021/151453 A1 | | 8/2021 | |

OTHER PUBLICATIONS

J.E. O'Brien et al., "A 25 kW high temperature electrolysis facility for flexible hydrogen production and system integration studies", International Journal of Hydrogen Energy, Elsevier, Amsterdam, NL, vol. 45, No. 32, May 11, 2020, pp. 15796-15804, XP086164464, ISSN: 0360-3199, DOI: 10.1016/J.IJHYDENE.2020.04.74, retrieved on May 11, 2020.

* cited by examiner

| Dynamic Utilizations Settings |
| Enable Dynamic Utilizations Logic |

| Overall Utilization Settings |
| Initial Current | | Initial Overall Util | |
| Final Current | | Final Overall Util | |

| Single Pass Utilization Settings |
| Initial Current | | Initial Overall Util | |
| Final Current | | Final Overall Util | |

STEAM RECYCLE CONTROL

FIELD OF THE INVENTION

The embodiments of the present invention generally relate to solid oxide electrolyzer cell (SOEC) mechanical systems, steam use, and associated safety systems.

BACKGROUND OF THE INVENTION

Solid oxide fuel cells (SOFC) can be operated as an electrolyzer in order to produce hydrogen and oxygen, referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are now transported from the fuel side to the air side. Since the cathode and anode are reversed between SOFC and SOEC (i.e. SOFC cathode is SOEC anode, and SOFC anode is SOEC cathode), the SOFC cathode (SOEC anode) can be referred to as the air electrode, and the SOFC anode (SOEC cathode) can be referred to as the fuel electrode. During SOEC mode, water in the fuel stream is reduced ($H_2O + 2e^- \rightarrow O^{2-} + H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

SUMMARY OF THE INVENTION

Accordingly, the present invention is directed to various steam recycle control that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments of the invention or the claims.

Values and ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X or +/−5% X. It will be further understood that the endpoints of each of the ranges are significant both in relation to the other endpoint, and independently of the other endpoint. The values and ranges provide examples, but the embodiments of the invention are not so limited.

Figure 1:
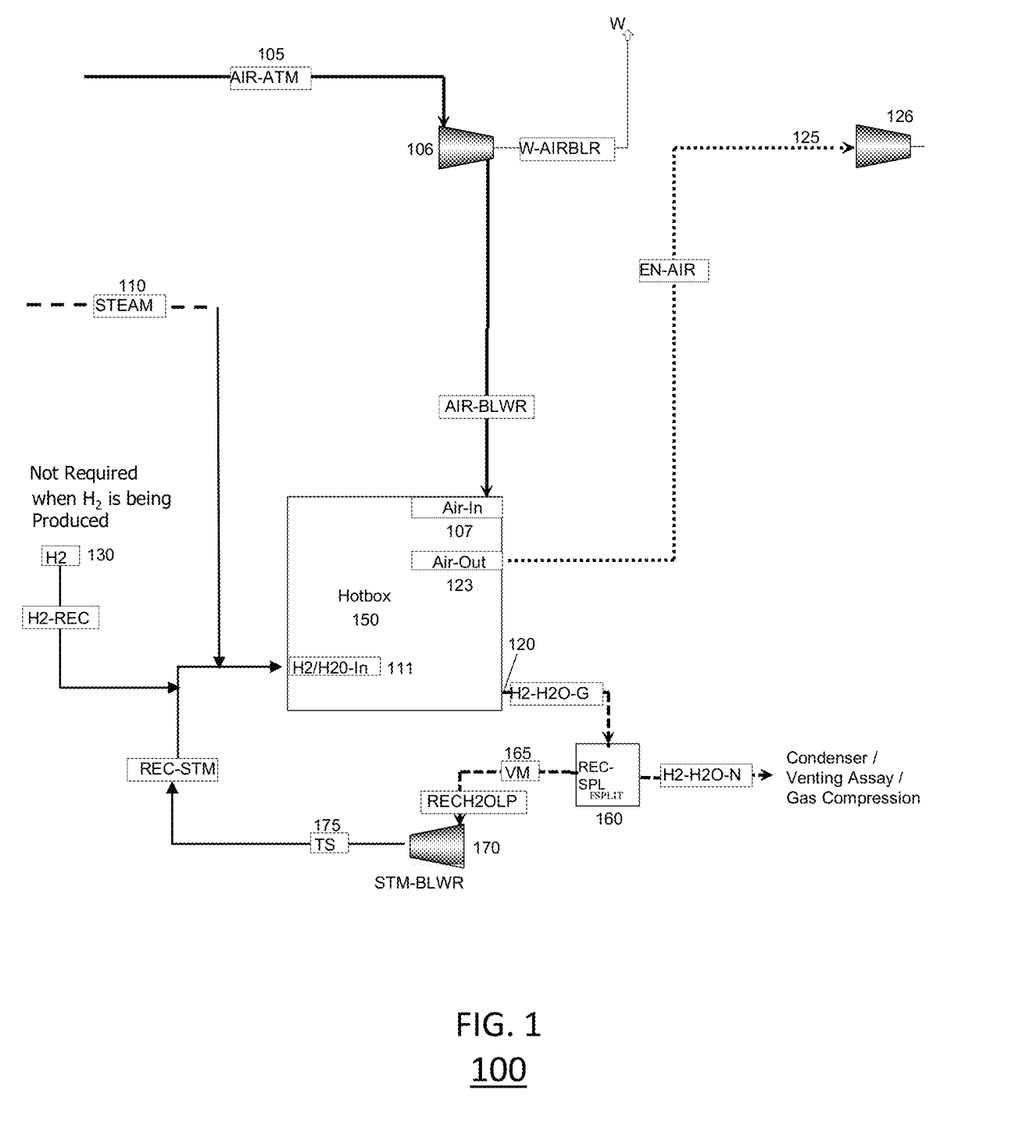
FIG. 1 is an SOEC system process flow diagram according to an example embodiment of the present invention.

FIG. 1 is an SOEC system 100 according to an example embodiment of the present invention.

As illustrated in FIG. 1, SOEC system 100 includes air conduit 105, air blower 106, air inlet 107, steam conduit 110, recycle steam inlet 111, hotbox 150, optional hydrogen conduit 130, enriched air outlet 123, enriched air conduit 125, enriched air blower 126, steam and hydrogen product outlet 120, splitter 160, Venturi flow meter 165, steam recycle blower 170, and thermal sensor 175.

According to an example configuration and operation, steam input at steam conduit 110 (e.g., supplying site or facility steam at varying pressures) can have a temperature of between about 100° C. and 110° C. (e.g., 105° C.) and a pressure of about 1 psig. In the various embodiments, steam may be input to the SOEC system 100 from an external source or may be generated locally. In some embodiments, multiple steam inlets may be configured to receive external and local steam, respectively. Alternatively, or additionally, water may be input to the SOEC system 100 and vaporized.

Air input (e.g., ambient air) at air conduit 105 may be ambient temperature, perhaps between about −20° C. and +45° C., at the local atmospheric pressure. Air from air conduit 105 is received at air blower 106, and air output by air blower 106 will be a slightly higher temperature than ambient due to the heat of compression. For example, the temperature of air output by air blower 106 may be about 30° C. at 1.0 psig as compared to 20° C. ambient air temperature. Air input of air conduit 105 is then received at air inlet 107 of hotbox 150.

Hydrogen from optional hydrogen conduit 130 may only be required for startup and transients when hydrogen is not being otherwise produced by SOEC system 100. For example, there is no longer a need for a separate hydrogen feed stream or hydrogen recycle steam at steady state. Pressure for this hydrogen stream is a design option determined at the time of site construction, and may be between about 5 psig and 3000 psig. The temperature is likely to be near ambient, as it is likely to be coming from storage.

Air input at air conduit 105, steam input at steam conduit 110, and hydrogen input at optional hydrogen conduit 130 are input to hotbox 150. In turn, hotbox 150 outputs steam and hydrogen product $H_2$—$H_2O$-G at steam and hydrogen product outlet 120 of hotbox 150, where G stands for Gross. Hotbox output $H_2$—$H_2O$-G may have a temperature between about 100° C. and 180° C. (e.g., 130° C.), a pressure of between about 0.1 and 0.5 psig.

In addition, hotbox output $H_2$—$H_2O$-G is input to splitter 160 and is split into a steam recycle stream $RECH_2OLP$, where LP stands for low pressure, and a net product $H_2$—$H_2O$—N, where N stands for Net (e.g., output for commercial use or storage). Here, net product $H_2$—$H_2O$—N may have a temperature between about 100° C. and 180° C. (e.g., 130° C.), a pressure of between about 0.1 psig and 0.5 psig. Steam recycle stream $RECH_2OLP$ may have a temperature of between about 100° C. and 180° C. (e.g., 130° C.), a pressure of between about 0.1 psig and 0.5 psig. Hotbox 150 may further output enriched air at enriched air outlet 123 via enriched air conduit 125 that may have a temperature of between about 120° C. and 300° C., at essentially local atmospheric pressure (e.g., less than 0.5 psig or less than 0.05 psig).

Steam recycle stream $RECH_2OLP$ is input to steam recycle blower 170. The resulting recycled steam REC-STM may have a temperature of between about 100° C. and 180° C. (e.g., 140° C., 154° C.), a pressure between about 0.5 and 1.5 psig (e.g., about 1 psig), and is input into hotbox 150 at recycle steam inlet 111. In some embodiments, there may be no recycled hydrogen feed included with the recycled steam.

As can be understood from FIG. 1, incoming steam temperature at steam conduit 110 (e.g., 105° C.) is low compared with a SOEC configuration with internal steam generation. In various configurations, a plurality of recycle loops can be configured to SOEC systems using both internal steam generation and external steam generation. As shown, recycle steam inlet 111 is configured to receive steam from steam conduit 110. Here, the embodiments optionally route the facility supplied steam from steam conduit 110, typically saturated and at a temperature of about 105° C., through the internal steam generation coils, one or more vaporizers, and/or other heating elements, and use the air exhaust heat (e.g., ~280° C.) to further heat (i.e., superheat) the steam supply before the heat is released at enriched air conduit 125 through optional fan or enriched air blower 126.

Figure 2:
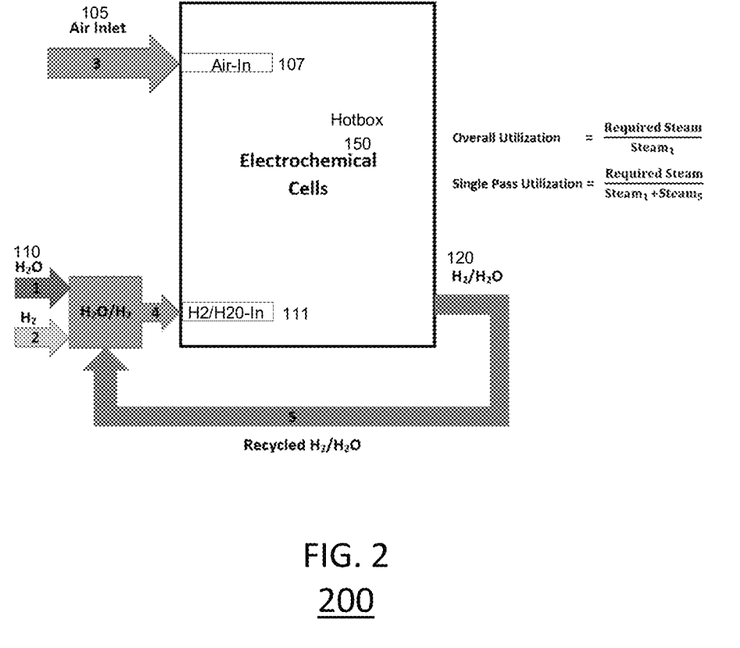
FIG. 2 is an SOEC system simplified process flow diagram according to another example embodiment of the present invention.

FIG. 2 is an SOEC system 200 simplified process flow diagram according to another example embodiment of the present invention. The components of SOEC system 200 are similar to the components of SOEC system 100, as described in connection with FIG. 1, and the differences between systems 200 and 100 and/or additional features will now be described.

In operation, an electrochemical reaction occurs in the solid oxide electrolyzer stacks of hotbox 150 when a mixture of high-temperature (e.g., superheated or extra heated) steam (e.g., greater than 110° C.) and hydrogen flow over the fuel electrode and electric current/voltage is applied. In some instances, a low percentage of hydrogen (e.g., from hydrogen product outlet 120, or from hydrogen conduit 130) in the fuel electrode inlet is needed to prevent fuel electrode oxidation (e.g., nickel oxidation).

In some operating states, when no hydrogen is generated by the electrochemical reaction, the required hydrogen for the fuel electrode is provided by one or more external sources (e.g., from hydrogen conduit 130). However, when the system is at hydrogen production state, the hydrogen required for the fuel electrode can be provided by recycling a portion of fuel electrode outlet stream that has hydrogen generated by the electrochemical reaction (e.g., hydrogen product outlet 120 and recycle steam inlet 111). Also, recycling enables increasing overall utilization of the steam by recycling a portion of unused steam. Overall utilization is the ratio of required steam to input steam (e.g., steam conduit 110). Recycling a portion of the unused steam brings single pass steam utilization lower than overall steam utilization. Single pass steam utilization is the ratio of required steam to the sum of input steam (e.g., steam conduit 110) and recycled steam (e.g., steam from hydrogen product outlet 120), as shown in FIG. 2.

To enable smoothing of the electrochemical voltage while ramping hydrogen production (e.g., from zero to full hydrogen production and vice versa), one or more control signals are provided to each of steam/water flow controller (not shown) and the recycle blower (e.g., steam recycle blower 170). Ramping hydrogen production occurs at start up and shut down, as well as when there is an alarm that interrupts the hydrogen production state and when resuming the hydrogen production state after the alarm has been resolved.

Lowering voltage fluctuations results in preventing local starvation and the appearance of local hot and cold spots along the electrolyzer cells which increases stack lifetime. Renewable green hydrogen production requires ramping up and down in hydrogen production rate to meet the available renewable electricity.

The amount of steam flow required in electrochemical reaction for hydrogen production is proportional to the demanded hydrogen production rate and inversely proportional to overall utilization setpoint. The hydrogen production rate is directly proportional to the operating current.

Steam flow rate setpoint is calculated as follows:

$$\text{Steam Flow } SP = \text{function}\left(\text{Operating Current}, \frac{1}{\text{Overall Steam Utilization } SP}\right)$$

In addition, the amount of recycle flow required in the system is calculated as follows:

Recycle Flow SP=function(Steam Flow SP, Overall Steam Utilization SP, Single Pass Steam Utilization SP)

In the various embodiments, the calculated (i.e., dynamic) overall utilization and the calculated (i.e., dynamic) single pass utilization setpoints are used to generate control signals for steam/water flow controller (nor shown) and the recycle blower (e.g., steam recycle blower) that reduce voltage fluctuations during ramping.

Figure 3:
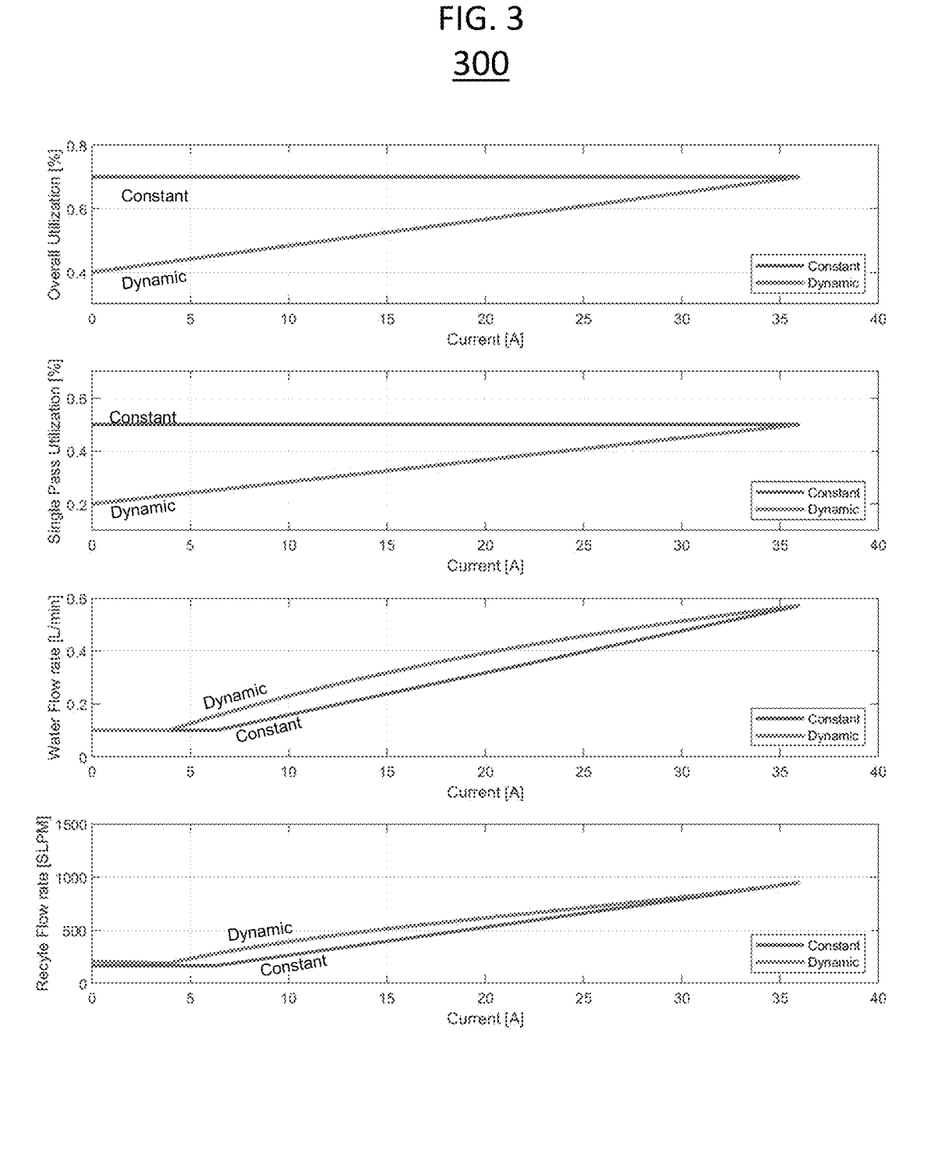
FIG. 3 graphically illustrates a linear increase in both overall utilization and single pass steam utilization setpoints with operating current which results in non-linear steam and recycle flow rate commands to steam/water flow controller and recycle blower.

FIG. 3 graphically illustrates a linear increase in both overall utilization and single pass steam utilization setpoints with operating current which results in non-linear steam and recycle flow rate commands to steam/water flow controller and recycle blower.

Further, since steam flow setpoint is directly proportional to operating current and inversely proportional to the overall utilization setpoint, dynamically increasing overall utilization setpoint spans the current range in which the steam flow rate increases, as shown in FIG. 3. This enables stable operation of the vaporizer (in internally generated steam units) in generating steam at desired temperature. As a result, faster ramp between zero to full hydrogen production can be achieved.

Figure 4:
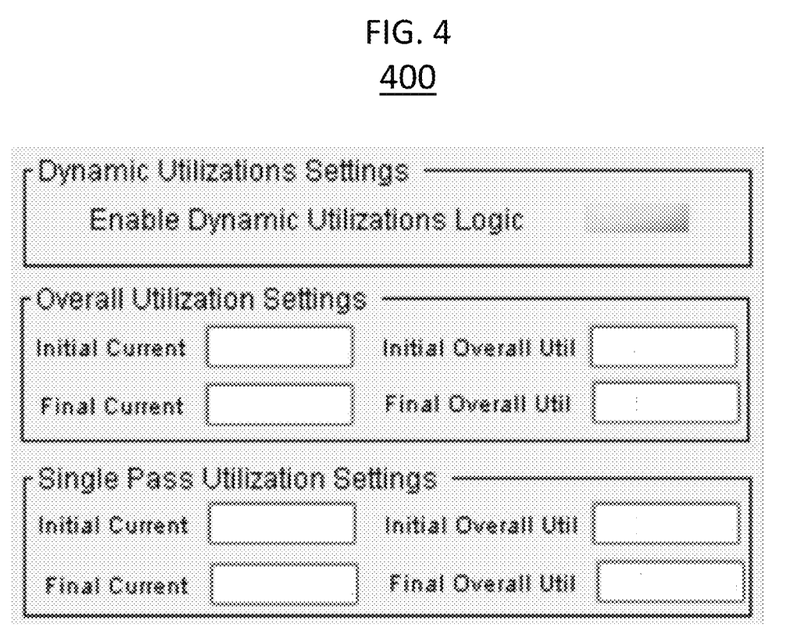
FIG. 4 illustrates a user control panel according to an example embodiment of the present invention.

FIG. 4 illustrates a user control panel 400 according to an example embodiment of the present invention. In the various embodiments, each of the overall utilization and single pass utilization setpoints can be ramped based on a user-input initial current (e.g., 0 Amps, or a value greater than 0 Amps) to a user-defined final current (e.g., full current, or a value less than full current), as shown in FIG. 4.

Figure 5A:
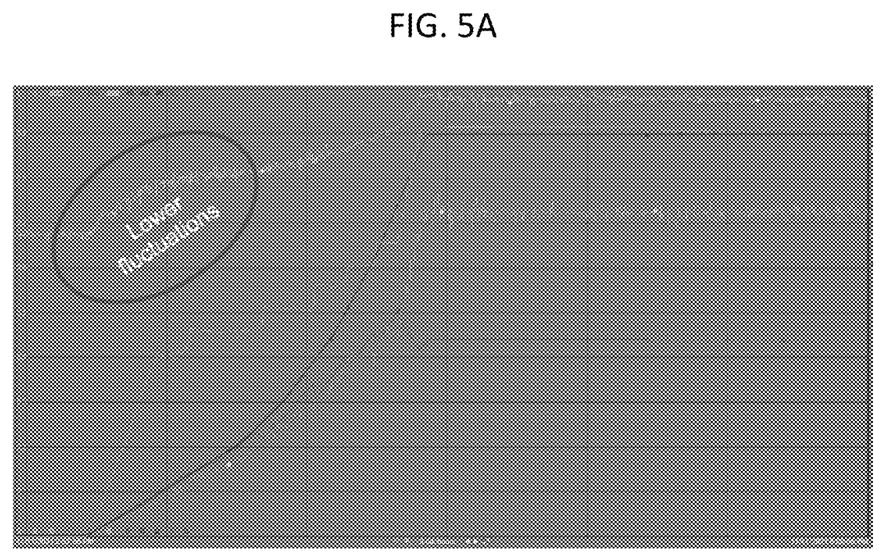
FIGS. 5A and 5B graphically illustrate the reduction in voltage fluctuation according to an example embodiment of the present invention
Figure 5B:
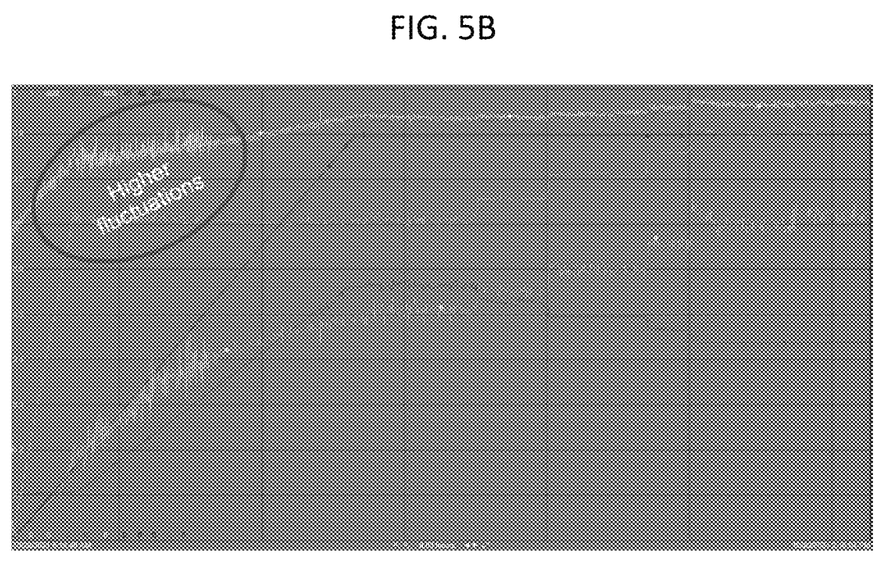

By using the calculated overall utilization and the calculated single pass utilization setpoints, significant reduction of voltage fluctuation is achieved during ramp-up and ramp-down (e.g., ramp from zero to full hydrogen production and vice versa). FIGS. 5A and 5B graphically illustrates the reduction in voltage fluctuation according to an example embodiment of the present invention. FIG. 5A illustrates the calculated utilizations approach with reduced (i.e., smoothed) segment voltage fluctuations through ramp-up. By contrast, FIG. 5B illustrates the constant utilizations approach with increased segment voltage fluctuations during ramp-up.

The calculated overall and single pass steam utilizations approach which commands dynamic non-linear flow rates of both steam and recycle during ramping results in lower voltage fluctuations compared to constant utilizations, constant flow rates, or partially constant utilization and partially constant flow rates approaches.

Accordingly, the various embodiments provide a steam flow and recycle flow control to significantly decrease voltage fluctuations during ramping. The embodiments provide dynamic overall and single pass utilization setpoints during ramp-up and ramp-down which determines dynamic steam flow and recycle flow setpoints. Use of dynamic setpoints reduces fluctuations in voltages while providing the possibility of faster ramp from zero hydrogen production to full hydrogen production. Additionally, the embodiments preserve the stacks in service for longer time duration (i.e., increasing lifetime) by lowering fluctuations. Local starvation and local hot and cold spots along the stacks are prevented. The embodiments further provide faster ramping for cases where internally generated steam of the solid oxide electrolyzer system is integrated with renewable resources having an intermittent nature (e.g., solar, wind, hydro, etc.).

As described herein, the embodiments modify the recycle flow based on use of calculated setpoints. One or more controllers (e.g., an embedded controller may be used). The embodiments improve the recycle performance and maintain the steam recycle blower (e.g., steam recycle blower 170) within its optimal temperature and pressure operation range. In the various embodiments, the recycle hardware speed is controlled during the electrolysis process.

Figure 6:
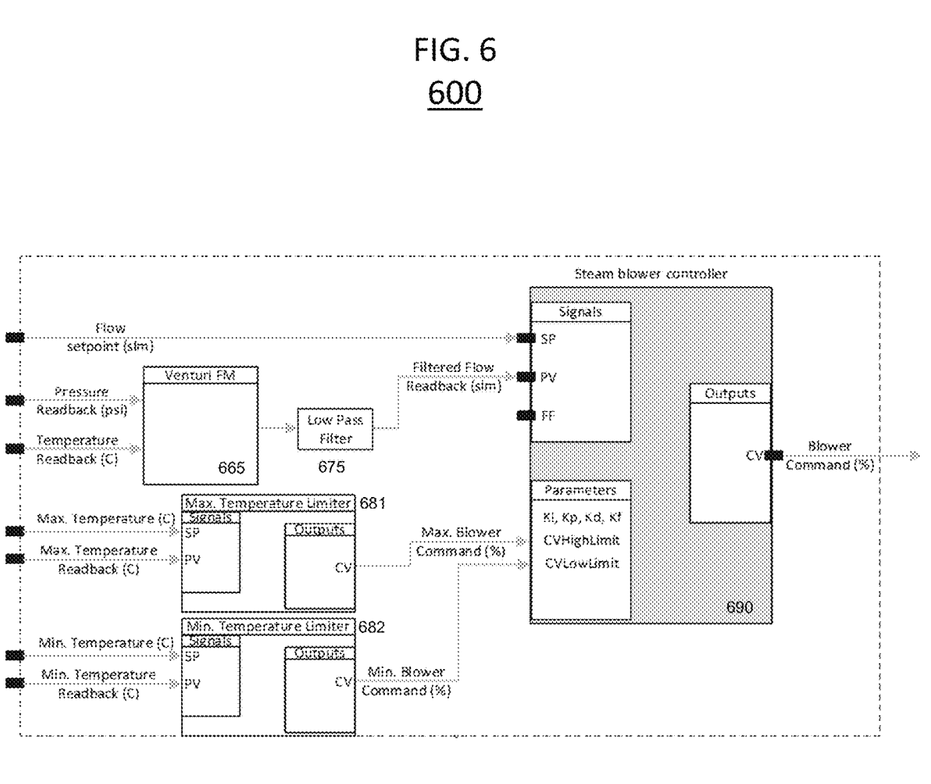
FIG. 6 illustrates a steam blower controller according to an example embodiment of the present invention.

FIG. 6 illustrates a steam blower controller 690 according to an example embodiment of the present invention.

In operation, an information exchange 600 occurs between controller 690 and the steam recycle blower (e.g., steam recycle blower 170). Controller 690 (e.g., an embedded controller within the system enclosure adjacent to hotbox 150) commands the steam recycle blower to retrieve the unused steam from the electrolysis reaction and feed it back to the steam inlet (e.g., recycle steam inlet 111) to maximize the efficiency of the overall process. For example, controller 690 determines a flow setpoint based on efficiency and performance calculations to meet the demands of the overall system. In some instances, steam blower controller 690 receives the flow setpoint from other segments of the embedded controller. Furthermore, pressure and temperature sensors are used to calculate the readback (i.e., feedback) flow using a Venturi flow meter 665 (e.g., Venturi flow meter 165). The readback flow signal can be filtered by low-pass filter 675 and supplied to steam blower controller 690 to calculate the appropriate blower speed hardware command.

In some embodiments, the maximum and minimum allowed blower commands are determined by one or more of the following: safe temperature upstream of the steam recycle blower, minimum speed to avoid steam back flow through the recycle line, and maximum speed to avoid overpressure events.

During operation, steam blower controller 690 is configured to monitor and control the steam recycle blower (e.g., steam recycle blower 170). For example, steam blower controller 690 uses one or more sensors (e.g., pressure sensor, thermal sensor 175 on the recycle line) to identify possible thermal events or reverse flow events and blower readback deviation. If any event or safety event is detected, steam blower controller 690 sends one or more commands to bring the system to a safe state to protect the hardware. Accordingly, efficient and safe control of a SOEC steam recycle loop is achieved through the combination of flow calculations, speed and flow control, temperature management, and pressure event control.

In addition, the embodiments provide control techniques that actively enable control of the operating temperature upstream of the steam recycle blower for the solid oxide electrolyzer cells (SOECs). In some embodiments, two temperature limiters such as maximum temperature limiter 681 and minimum temperature limiter 682 are configured to control the temperature range for the recycle blower controller. These temperature limiters 681, 682 set the maximum and minimum allowed speed for the recycle blower and manage its hardware speed. Temperature limiters 681, 682 utilize one or more thermal sensors on the recycle line. The temperature readbacks are compared to the operation limits of the blower hardware and the maximum and minimum allowed blower commands are then set as CV (control variable) high and low limits on the steam blower controller block.

Here, controller 690 includes a range of commands from the blower maximum allowed speed and the blower minimum allowed speed. The maximum temperature limit guarantees that the blower does not operate at temperature ranges that may damage its durability and performance. The minimum temperature limit forces the steam blower to run fast enough to avoid condensing liquid water in the steam recycle line and avoid possible damage to the system.

By using the various embodiments, condensation of water downstream of the recycle blower is reduced or avoided and condensation does not feedback to the hotbox (e.g., hotbox 150), at least a minimum flow delivery is provided for the steam recycle line, and the system is stopped if a temperature range (e.g., downstream of steam recycle blower 170 at thermal sensor 175) cannot be guaranteed. When increasing the blower speed, more flow is circulated, increasing the temperature upstream. Similarly, when less flow is commanded, and the blower speed is reducing, the temperature of the steam recycle loop decreases.

Minimum temperature control action increases the recycle blower speed to avoid liquid water in the steam recycle line: Similarly, maximum temperature control action decreases the blower speed to avoid temperature regions that may damage the blower:

In each of the various embodiments described herein, one or more sensors or detectors can be used to detect a safety event. For example, one or more pressure detectors and one or more thermal detectors can be used. One or more pressure detectors can be placed along input hydrogen conduits to detect under pressure (e.g., under 5 PSI) and excess pressure. If a pressure detector is tripped, the system (i.e., hotbox 150) is shutdown. Additionally, one or more thermal detectors can be placed within the cabinet of the hotbox to detect excess heat (e.g., over 230° C.). Cabinet ventilation is provided and maintained by enriched air blower 126, for example. If a thermal detector is tripped, the system (i.e., hotbox 150) is shutdown.

The SOEC system (e.g., 100) ceases receiving hydrogen when the SOEC system is operating at steady state or upon detection of a safety event. Additionally, the stack of electrolyzer cells in hotbox 150 can be configured to receive hydrogen when the SOEC system is in startup, shutdown, or when the SOEC system is not producing hydrogen or not producing enough hydrogen.

Accordingly, the various embodiments provide SOEC mechanical systems and associated safety systems. To operate an SOEC there are mechanical systems and components required to provide water, air, and start-up fuel. Safety systems also protect the system against fire and other damage to the surroundings and people in proximity. Operating the SOEC with required safety systems prevents harm and hazards due to leaking hydrogen and/or other failures. Other SOEC systems may include hazardous location devices, or double containment of fuel components.

It will be apparent to those skilled in the art that various modifications and variations can be made in the steam recycle control of the present invention without departing from the spirit or scope of the invention. Thus, it is intended that the present invention cover the modifications and variations of this invention provided they come within the scope of the appended claims and their equivalents.

What is claimed is:

1. A solid oxide electrolyzer cell (SOEC) system comprising:
   a stack of electrolyzer cells configured to receive steam in combination with hydrogen;
   a hotbox, wherein the stack of electrolyzer cells are located inside of the hotbox;
   a steam recycle outlet configured to recycle a portion of the steam;
   a hydrogen conduit located outside of the hotbox and fluidly connected to the stack of electrolyzer cells; and
   a controller;
   wherein the hydrogen conduit is configured to provide external hydrogen to the stack of electrolyzer cells when the SOEC system is in startup, and the controller is configured to send commands to the SOEC system to cease providing the external hydrogen to the stack of electrolyzer cells when the SOEC system is operating at steady state or when the SOEC system detects a safety event.

2. The SOEC system of claim 1, wherein a hydrogen and steam exhaust stream is recycled back to the stack.

3. The SOEC system of claim 2, further comprising a splitter that supplies a portion of the hydrogen and steam exhaust to a steam recycle blower.

4. The SOEC system of claim 3, wherein the steam recycle blower is controlled by the controller.

5. The SOEC system of claim 3, wherein the steam recycle blower is controlled by the controller, and the controller is embedded within the hotbox.

6. The SOEC system of claim 4, wherein a command to the steam recycle blower is determined according to one or more setpoints.

7. The SOEC system of claim 4, wherein a command to the steam recycle blower is determined according one or more pressure sensors.

8. The SOEC system of claim 1, wherein the controller is further configured to send commands to the SOEC system for the stack of electrolyzer cells to receive the external hydrogen when the SOEC system is in shutdown, or when the SOEC system is not producing hydrogen.

9. The SOEC system of claim 1, wherein the controller is further configured to send commands to the SOEC system for the stack of electrolyzer cells to receive hydrogen when the SOEC system is using a renewable energy source.

10. The SOEC system of claim 1, wherein the safety event is detected by a pressure detector or a thermal detector.

11. The SOEC system of claim 1, wherein steam output by the recycle steam outlet is mixed with hydrogen and a combination of steam and hydrogen is supplied to a recycle steam inlet.

12. A method of operating a solid oxide electrolyzer cell (SOEC) system comprising:
   receiving, at a stack of electrolyzer cells located inside a hotbox, steam in combination with hydrogen;
   recycling, at a steam recycle outlet, a portion of the steam;
   providing external hydrogen from outside of the hotbox to the stack of electrolyzer cells during startup of the SOEC system;
   ceasing providing the external hydrogen to the stack of electrolyzer cells during steady state operation of the SOEC system; and
   ceasing providing hydrogen to the stack of electrolyzer cells when the SOEC system detects a safety event.

13. The SOEC system of claim 1, wherein a hydrogen and steam exhaust stream that is recycled back to the stack maintains a temperature greater than 100° C.

* * * * *